US008122257B2

(12) United States Patent
Rhoads et al.

(10) Patent No.: US 8,122,257 B2
(45) Date of Patent: Feb. 21, 2012

(54) AUDIO-BASED, LOCATION-RELATED METHODS

(75) Inventors: Geoffrey B. Rhoads, West Linn, OR (US); William Y. Conwell, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 12/820,744

(22) Filed: Jun. 22, 2010

(65) Prior Publication Data

US 2010/0322035 A1    Dec. 23, 2010

Related U.S. Application Data

(60) Division of application No. 12/498,930, filed on Jul. 7, 2009, which is a continuation of application No. 09/476,686, filed on Dec. 30, 1999, now Pat. No. 7,562,392.

(60) Provisional application No. 60/134,782, filed on May 19, 1999.

(51) Int. Cl.
*H04L 9/00* (2006.01)
*H04K 1/00* (2006.01)
(52) U.S. Cl. ........................ 713/176; 380/258
(58) Field of Classification Search .................. 380/258; 713/172, 176, 192–194; 726/26–31; 705/51, 705/56–59
See application file for complete search history.

(56) References Cited

U.S. PATENT DOCUMENTS

| | | | |
|---|---|---|---|
| 4,660,022 A | 4/1987 | Osaka | |
| 5,144,594 A | 9/1992 | Gilchrist | |
| 5,243,652 A * | 9/1993 | Teare et al. | 380/250 |
| 5,493,283 A * | 2/1996 | Hopper et al. | 340/5.8 |
| 5,508,699 A | 4/1996 | Silverman | |
| 5,600,727 A | 2/1997 | Sibbald et al. | |
| 5,764,770 A | 6/1998 | Schipper | |
| 5,798,922 A | 8/1998 | Wood et al. | |
| 5,930,369 A * | 7/1999 | Cox et al. | 380/54 |
| 5,940,346 A | 8/1999 | Sadowsky | |
| 6,157,592 A | 12/2000 | Kriz | |
| 6,282,362 B1 | 8/2001 | Murphy et al. | |
| 6,442,285 B2 | 8/2002 | Rhoads et al. | |
| 6,453,281 B1 * | 9/2002 | Walters et al. | 704/200 |
| 6,505,160 B1 | 1/2003 | Levy et al. | |
| 6,522,769 B1 | 2/2003 | Rhoads et al. | |
| 6,608,549 B2 | 8/2003 | Mynatt et al. | |
| 6,611,196 B2 | 8/2003 | Mynatt et al. | |
| 6,628,928 B1 | 9/2003 | Crosby | |

(Continued)

FOREIGN PATENT DOCUMENTS

WO    WO 97/43736    11/1997

OTHER PUBLICATIONS

U.S. Appl. No. 09/337,590, filed Jun. 21, 1999, Geoffrey B. Rhoads.

(Continued)

*Primary Examiner* — Hosuk Song

(57) ABSTRACT

The presently claimed technology relates generally to audio-based, location-related methods. One claim recites a method in which a microphone in a user's portable device captures ambient sound, and corresponding data is then processed to determine location information about the user's location. Action is then taken involving the determined location information. By such arrangement, location information is determined by reference to ambient sound captured by a user-carried portable device. A great number of other features and arrangements are also detailed.

17 Claims, 4 Drawing Sheets

U.S. PATENT DOCUMENTS

| | | |
|---|---|---|
| 6,636,249 B1 | 10/2003 | Rekimoto |
| 6,674,993 B1 | 1/2004 | Tarbouriech |
| 6,804,376 B2 | 10/2004 | Rhoads et al. |
| 6,829,368 B2 | 12/2004 | Meyer et al. |
| 6,829,430 B1 | 12/2004 | Ashizaki |
| 6,850,626 B2 | 2/2005 | Rhoads et al. |
| 6,941,275 B1 | 9/2005 | Swierczek |
| 6,965,682 B1 | 11/2005 | Davis et al. |
| 6,983,057 B1 | 1/2006 | Ho |
| 7,171,018 B2 | 1/2007 | Rhoads et al. |
| 7,185,201 B2 | 2/2007 | Rhoads et al. |
| 7,194,752 B1 | 3/2007 | Kenyon |
| 7,302,574 B2 | 11/2007 | Conwell et al. |
| 7,333,957 B2 | 2/2008 | Levy et al. |
| 7,349,552 B2 | 3/2008 | Levy et al. |
| 7,505,605 B2 | 3/2009 | Rhoads et al. |
| 7,545,951 B2 | 6/2009 | Davis et al. |
| 7,562,392 B1 | 7/2009 | Rhoads et al. |
| 7,565,294 B2 | 7/2009 | Rhoads |
| 7,587,602 B2 | 9/2009 | Rhoads |
| 7,590,259 B2 | 9/2009 | Levy et al. |
| 7,593,576 B2 | 9/2009 | Meyer et al. |
| 7,650,010 B2 | 1/2010 | Levy et al. |
| 7,711,564 B2 | 5/2010 | Levy et al. |
| 2001/0011233 A1 | 8/2001 | Narayanaswami |
| 2001/0044744 A1 | 11/2001 | Rhoads |
| 2001/0053234 A1 | 12/2001 | Rhoads |
| 2007/0100757 A1 | 5/2007 | Rhoads |
| 2007/0174059 A1 | 7/2007 | Rhoads et al. |
| 2007/0185840 A1 | 8/2007 | Rhoads |
| 2007/0195987 A1 | 8/2007 | Rhoads |
| 2007/0250194 A1 | 10/2007 | Rhoads et al. |
| 2007/0250716 A1 | 10/2007 | Rhoads et al. |
| 2008/0028223 A1 | 1/2008 | Rhoads |
| 2008/0133416 A1 | 6/2008 | Rhoads |
| 2008/0133556 A1 | 6/2008 | Conwell et al. |
| 2008/0140573 A1 | 6/2008 | Levy et al. |
| 2008/0319859 A1 | 12/2008 | Rhoads |
| 2009/0177742 A1 | 7/2009 | Rhoads et al. |
| 2010/0008586 A1 | 1/2010 | Meyer et al. |
| 2010/0009722 A1 | 1/2010 | Levy et al. |
| 2010/0036881 A1 | 2/2010 | Rhoads et al. |
| 2010/0046744 A1 | 2/2010 | Rhoads et al. |
| 2010/0138012 A1 | 6/2010 | Rhoads |
| 2010/0150395 A1 | 6/2010 | Davis et al. |
| 2010/0185306 A1 | 7/2010 | Rhoads |
| 2010/0322035 A1 | 12/2010 | Rhoads et al. |

OTHER PUBLICATIONS

U.S. Appl. No. 09/491,534, filed Jan. 26, 2000, Bruce L. Davis, et al.
U.S. Appl. No. 09/515,826, filed Feb. 29, 2000, Geoffrey B. Rhoads.
U.S. Appl. No. 09/574,726, filed May 18, 2000, Geoffrey B. Rhoads.
Clarkson et al, "Extracting Context from Environmental Audio," Second International Symposium on Wearable Computers (ISWC'98), 1998 (2 pages).
Clarkson et al, Auditory Context Awareness via Wearable Computing, MIT Media Lab, 1998 (6 pages).
Clarkson, et al, Unsupervised Clustering of Ambulatory Audio and Video, Proc ICASSP'99 (4 pages).
Mynatt et al, Designing Audio Aura, CHI 98, 1998, pp. 566-573.
Mynatt et al, Metaphors for Nonvisual Computing, Georgia Institute of Technology Technical Report GIT-GVU-92-28, 1993 (20 pages).
Rabinkin et al, DSP Implementation of Source Location Using Microphone Arrays, Proc. SPIE vol. 2846, 1996 (17 pages).

\* cited by examiner

AUDIO-BASED, LOCATION-RELATED METHODS

RELATED APPLICATION DATA

This application is a division of application Ser. No. 12/498,930, filed Jul. 7, 2009, which is a continuation of application Ser. No. 09/476,686, filed Dec. 30, 1999 (now U.S. Pat. No. 7,562,392), which claims benefit of U.S. Provisional Patent Application 60/134,782, filed May 19, 1999, attached hereto as Appendix A.

The technology detailed in the present application is also related to that detailed in application Ser. Nos. 09/343,104, filed Jun. 29, 1999; 09/292,569, filed Apr. 15, 1999 (abandoned in favor of continuation application Ser. No. 10/379,393, filed Mar. 3, 2003, now U.S. Pat. No. 7,263,203); 09/314,648, filed May 19, 1999 (now U.S. Pat. No. 6,681,028); 60/141,763, filed Jun. 30, 1999; 60/158,015, filed Oct. 6, 1999; 60/163,332, filed Nov. 3, 1999; 60/164,619, filed Nov. 10, 1999; 09/452,023, filed Nov. 30, 1999 (now U.S. Pat. No. 6,408,082); 09/452,021, filed Nov. 30, 1999 (now U.S. Pat. No. 7,044,395); and in U.S. Pat. No. 5,862,260.

INTRODUCTION 16 year old Bob struts into the coffee shop down from high school with a couple of buddies, a subtle deep pound in the ambient sound track lets them know they're in the right place. The three of them instinctually pull out of their pockets their audio Birddawgs (a small hand held unit about the size and style of an auto-door-alarm device, or "fob"), and when they see the tiny green light, they smile, high five, and push the big "GoFetch" button in synchrony. That tune will now be waiting for them at home, safely part of their preferred collection and ever-so-thankfully not lost to their collective bad memory (if they even knew the name of the artist and tune title in the first place!).

33 year old Mary is at home listening to the latest batch of holiday tunes being offered up over her 2-decade-long favorite radio station. She's spent many days now half-consciously culling the tunes for that perfect arrangement for the new year's bash that she regrettably agreed to host. 10:40 AM rolls around and some new tune catches her ear, a tune she knows can work well following the jingle-cats rendition of Strawberry Fields. She half jogs over to the stereo and hits the "GoFetch" button. In a few days, she'll sit down at the computer and put together the final sound track for the gala evening ahead, her play list dutifully waiting for her shuffling instructions and desired start time.

49 year old Jack (the financial analyst) is thoroughly bored sitting in the crowded gate D23 at Dulles. Droning 20 feet up and over his head is the airport network station, currently broadcasting the national weather report. As the segue to the business segment approaches, the teaser review mentions that they'll be having a report on today's rally in the bond market and the driving forces behind it. Jack pulls out his Birddawg-enabled Palm Pilot on the off-chance they actually will have a little depth in the reporting. Indeed, as the segment plays and starts discussing the convoluted effects of Greenspan's speech to the Internet-B-Free society, he taps the "GoFetch" button, knowing that once he gets back to his main browsing environment he will be able to follow dozens of links that the airport network has pre-assigned to the segment.

The foregoing and other features and advantages of the present technology will be more readily apparent from the following detailed description, which proceeds with reference to the accompanying figures.

DETAILED DESCRIPTION

Figure 1:
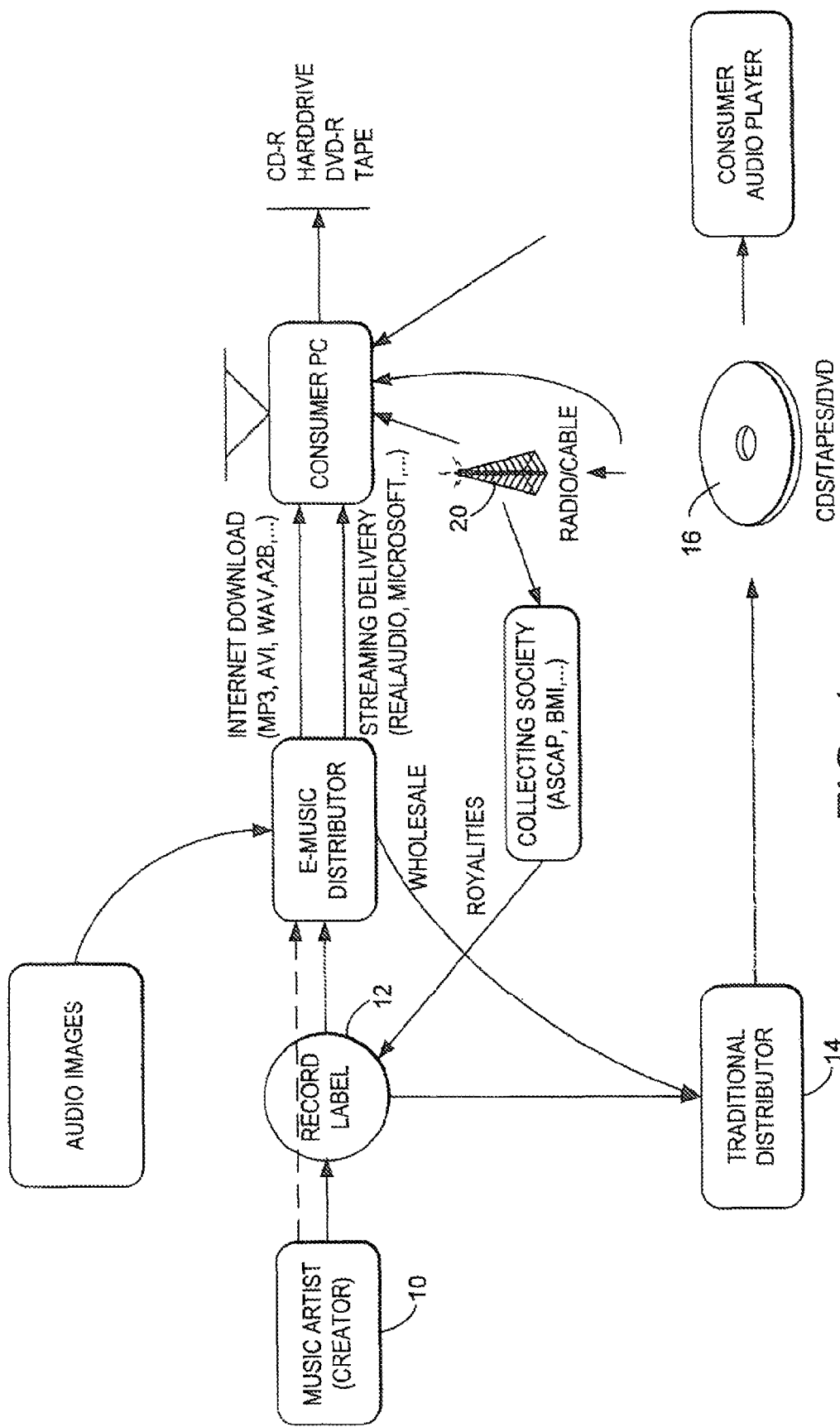
FIG. 1 is a diagram showing the participants, and channels, involved in the distribution of music.
Figure 2:
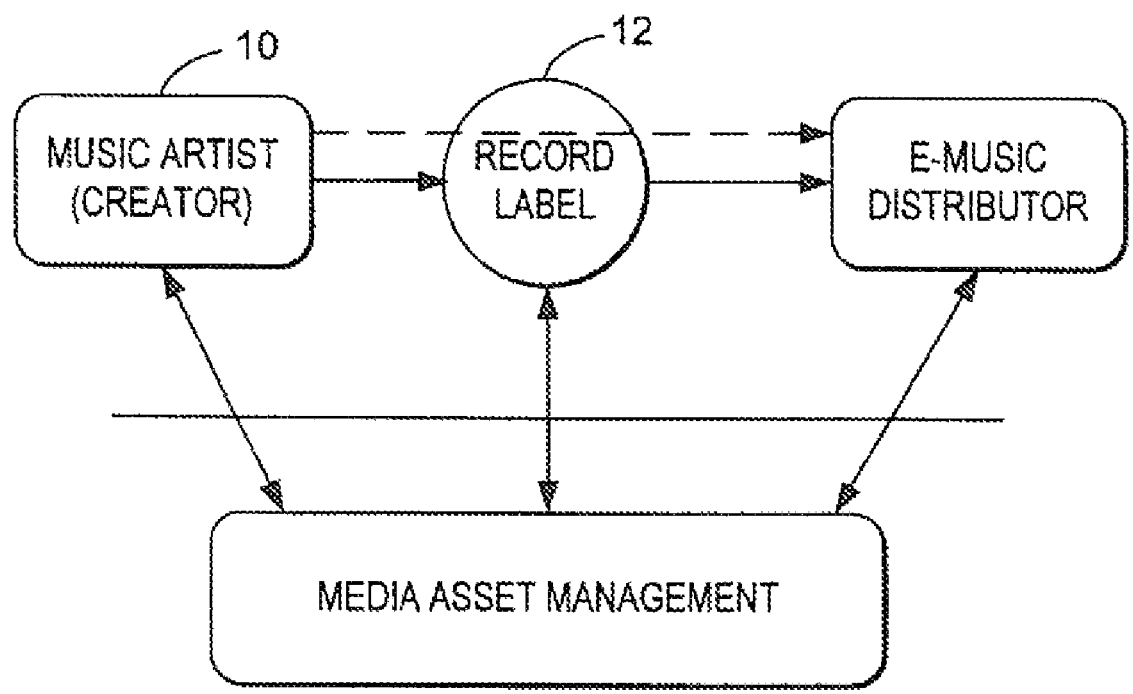
FIG. 2 shows a conceptual model of how music artists, record labels, and E-Music distributors can all interact with a Media Asset Management System, of which several are detailed in the following specification.
Figure 3:
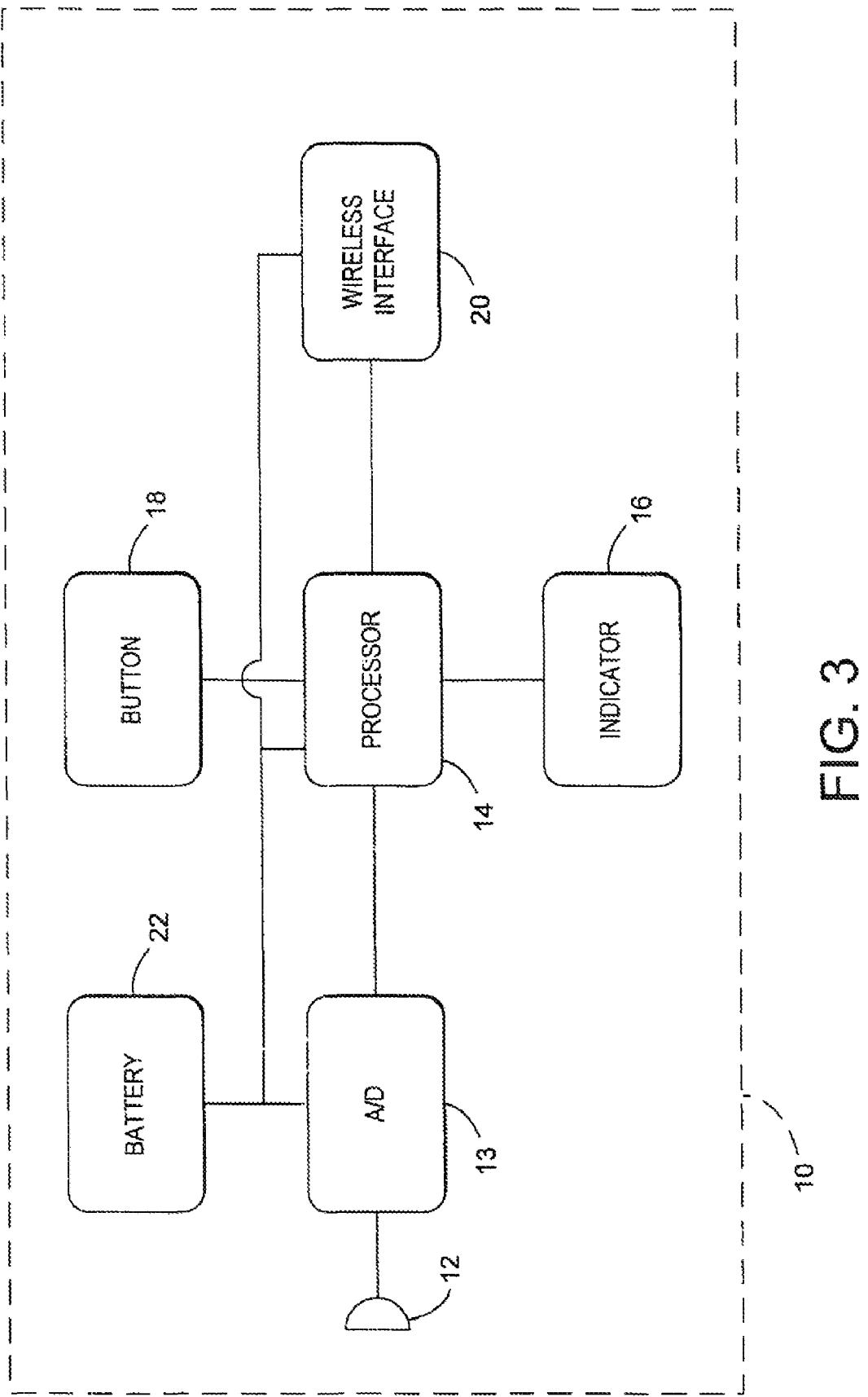
FIG. 3 is a block diagram of a device according to one embodiment of the present technology.

Referring to FIG. 3, a device 10 according to one embodiment of the present technology includes a microphone 12, an A/D converter 13, a processor 14, one or more indicators 16, one or more buttons 18, a wireless interface 20, and a power source 22.

The device can be packaged in a small plastic housing, preferably as small as is practical (e.g., sized and configured to serve as a key chain ornament, perhaps akin to the Tomagatchi toys that were recently popular). The housing has one or more small holes to permit audio penetration through the housing to the microphone 12.

The processor 14 can take various forms, including a dedicated hardware device (e.g., an ASIC), a general purpose processor programmed in accordance with instructions stored in non-volatile RAM memory, etc.

The indicators 16 can be as simple as a single LED lamp, or as complex as an alphanumeric LCD or other multi-element display. In one embodiment, the indicator simply indicates when the processor has decoded a watermark in audio sensed by the microphone. More elaborate signaling techniques can of course be used, including two- or three-color LEDs that can be used to signal different states with different colors, indicators with flashing patterns or changing displays, etc.

The buttons 18 are used by the user to indicate an interest in the audio just-heard. In one embodiment, there is a single button 18, and it is emblazoned with a stylized legend that can serve as a trademark or service mark, e.g., GetIt!, GoFetch, Birddawg, something Batman-esque ("Wham," "Zappp," "Pow!!," etc.), or something more mundane (e.g., Capture).

The power source 22 can be a battery, solar cell, storage capacitor, or other source of energy suitable for powering the components of the device 10.

Figure 4:
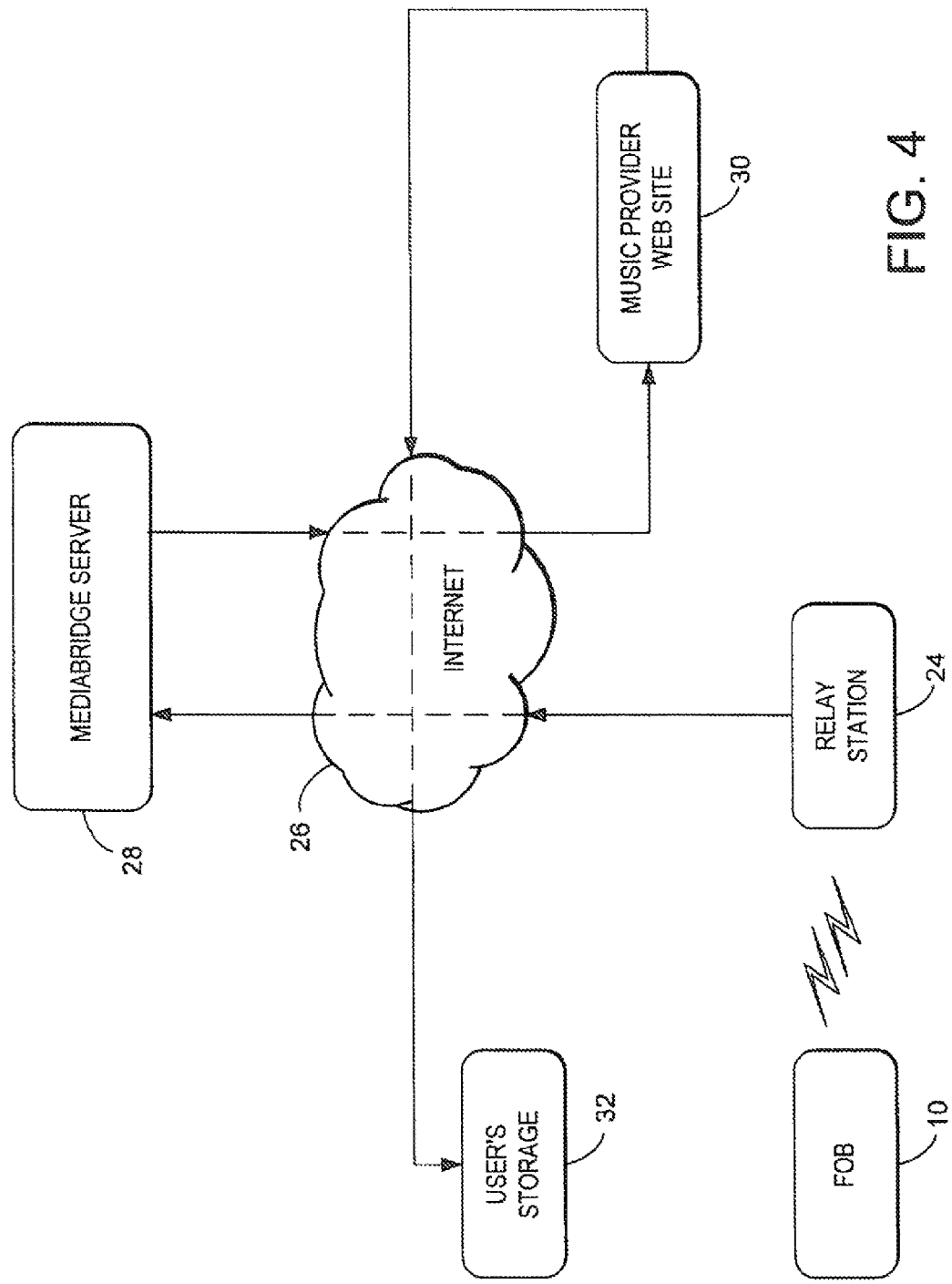
FIG. 4 is a block diagram of a system in which the device of FIG. 3 may be utilized.

The wireless interface 20 serves to exchange data with a relay station 24 (FIG. 4). In one embodiment, the interface is radio-based, and provides a one-way communications channel. In other embodiments other wireless technologies can be used (e.g., IR), and/or two-way communication can be provided.

The relay station can be a cellular repeater (if the interface transmits using cellular frequencies and protocols), or a local receiver, e.g., associated with the user's computer. The relay station can also be a paging system relay station (e.g., as are used for two-way pagers), or may be a low earth orbit satellite-based repeater.

In operation, the processor monitors the ambient audio for the presence of encoded data, e.g., a digital watermark, and decodes same. If power considerations permit, the device is "always-on." In other embodiments, one of the buttons 18 can be used to awaken the device. In such other embodiments, another button-press can serve to turn-off the device, or the device can power-down after a predetermined period, e.g., of not sensing any watermarked audio.

A number of techniques for watermarking audio (and decoding same) are known, as illustrated by U.S. Pat. Nos. 5,862,260, 5,963,909, 5,940,429, 5,940,135, 5,937,000, 5,889,868, 5,833,432, 5,945,932, WO9939344 (corresponding to U.S. application Ser. No. 09/017,145), and WO9853565 (corresponding to U.S. application Ser. Nos. 08/858,562 and 08/974,920). Commercially-available audio watermarking software includes that available from AudioTrack, Verance (formerly Aris/Solana), Cognicity, Liquid Audio, and others.

The data payload encoded by the watermark (the audio-ID) may take various forms. One is a Digital Object Identifier— an ID corresponding to the standardized digital object numbering system promulgated by the International DOI Foundation (www.doi.org). Another is to include plural data fields variously representing, e.g., the name of the publisher, the name of the artist, the title of the work, the date of publication, etc., etc. Another is to encode a unique identifier (UID), e.g., of 16-64 bits. The UID serves as an index to a remote database where additional information (e.g., publisher, artist, title, date of publication, etc., are stored). The data transmitted from the device 10 to the relay station 24 typically includes some or all of the watermark payload data, and also includes data identifying the device 10, or its user (user-ID data). Again, this data can include several data fields (e.g. user name, audio delivery information such as email address or URL, age, gender, model of device 10, etc.). Alternatively, a serial number or other unique identifier can be used, which serves as an index to a database have a corresponding record of information relating to the user and/or device.

The audio-ID and user-ID data are typically formatted and encoded by the device 10 according to a protocol that provides error correcting, framing, and other data useful in assuring reliable transmission to the relay station, and/or for further transport.

Some embodiments of device 10 recognize just a single form of watermarking, and can understand only payload data presented in a single format. In other embodiments, the device may be capable of recognizing watermarking according to several different techniques, and with several different payload formats. This latter functionality can be achieved, e.g., by cyclically trying different decoding techniques until one that produces valid output data (e.g., by reference to a checksum or other indicia) is obtained. That decoding technique and payload interpretation can thereafter be used until valid output data is no longer obtained.

In some embodiments, the device 10 transmits data to the relay station at the moment the user presses the button 18. In other embodiments, a store-and-forward mode is used. That is, when the user presses the button 18, the decoded watermark data is stored in memory within the device. Thereafter, e.g., when the device is coupled with a "nest" or "holster" at the user's computer (or when download capability is otherwise activated), the stored data is downloaded—either through that device or otherwise.

The infrastructure between the device 10 and delivery of the audio to its ultimate destination can take myriad forms. One is shown in FIG. 4. In this arrangement, some or all of the data received by the relay station 24 is routed through the internet 26 to a server 28. (The server 28 can be a "MediaBridge" server of the type described, e.g., in the assignee's applications 60/164,619, filed Nov. 10, 1999, and Ser. No. 09/343,104, filed Jun. 29, 1999.) Server 28 parses the data and routes some or all of it to a data repository 30 at which the audio requested by the user is stored. This repository, in turn, dispatches the audio to the user (e.g., to a computer, media player, storage device, etc.), again through the internet. (Address information detailing the destination 32 of the audio may be included in the data sent from the device 10, or can be retrieved from a database at the server 28 based on a user-ID sent from the device 10.)

In some embodiments, the repository 30 (which may be co-located with server 28, or not) includes various data beyond the audio itself. For example, the repository can store a collection of metadata (e.g., XML tags) corresponding with each stored item of audio. This metadata can be transmitted to the user's destination 32, or can be used, e.g., for rights management purposes (to limit the user's reproduction or re-distribution rights for the audio, etc.), to establish a fee for the audio, etc. One suitable metatag standard is that under development by <indecs> (Interoperability of Data in E-Commerce Systems, www.indecs.org).

The audio data can be delivered in streaming form, such as using technology available from RealNetworks (RealAudio), Microsoft (Windows Media Player), MP3, Audiobase, Beatnik, Bluestreak.com, etc. The former three systems require large (e.g., megabytes) player software on the receiving (client) computer; the latter do not but instead rely, e.g., on small Java applets that can be downloaded with the music.

Alternatively, the audio can be delivered in a file format. In some embodiments the file itself is delivered to the user's destination 32 (e.g., as an email attachment). In others, the user is provided a URL to permit access to, or downloading of, the audio. (The URL may be a web site that provides an interface through which the user can pay for the requested music, if pre-payment hasn't been arranged.)

The user's destination 32 is typically the user's own computer. If a "live" IP address is known for that computer (e.g., by reference to a user profile database record stored on the server 28), the music can be transferred immediately. If the user's computer is only occasionally connected to the internet, the music can be stored at a web site (e.g. protected with a user-set password), and can be downloaded to the user's computer whenever it is convenient.

In other embodiments, the destination 32 is a personal music library associated with the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own internet connection. Or it can be equipped with wireless capabilities, permitting it to receive digital music from wireless broadcasts (e.g. from a transmitter associated with the server 28). In either case, the library can provide music to the user's playback devices by short-range wireless broadcast.

In many embodiments, technology such as that available from Sonicbox, permits audio data delivered to the computer to be short range FM-broadcast by the user's computer to nearby FM radios using otherwise-unused radio spectrum.

Some implementations of the present technology support several different delivery technologies (e.g., streaming, file, URL), and select among them in accordance with the profiles of different users.

Payment for the audio (if needed) can be accomplished by numerous means. One is by charging of a credit card account associated with the user (e.g., in a database record corresponding to the user-ID).

Some implementations of the technology make use of secure delivery mechanisms, such as those provided by InterTrust, Preview Systems, etc. In addition to providing secure containers by which the audio is distributed, such systems also include their own secure payment facilities.

By such arrangements, a user can conveniently compile an archive of favorite music—even while away from home.

To provide a comprehensive disclosure without unduly lengthening this specification, the disclosures of the applications and patents cited above are incorporated herein by reference.

Having described and illustrated the principles of my technology with reference to a preferred embodiment and several variations thereof, it should be apparent that the detailed embodiment is illustrative only and should not be taken as limiting the scope of my technology.

For example, while the technology is illustrated with reference to a button that is activated by the user to initiate capture of an audio selection, other interfaces can be used. For example, in some embodiments it can be a voice-recognition system that responds to spoken commands, such as "capture" or "record." Or it can be a form of gesture interface.

Likewise, while the technology is illustrated with reference to a stand-alone device, the same functionality can be built-into radios (including internet-based radios that receive wireless IP broadcasts), computer audio systems, and other appliances. In such case the microphone can be omitted and, in some cases, the wireless interface as well. (The data output from the device can be conveyed, e.g., through the network connection of an associated computer, etc.)

Moreover, while the technology is illustrated with reference to an embodiment in which audio, alone, is provided to the user, this need not be the case. As in the Dulles airport scenario in the introduction, the server 28 can provide to the user several internet links associated with the sensed audio. Some of these links can provide commerce opportunities (e.g., to purchase a CD on which the sensed audio is recorded). Others can direct the user to news sites, concert schedules, fan-club info, etc. In some such embodiments, the ancillary information is provided to the user without the audio itself.

Although not particularly detailed, the data provided to the user's destination typically includes information about the context in which the data was requested. In a simple case this can be the time and date on which the user pressed the Capture button. Other context information can be the identification of other Birddawg devices 10 that were nearby when the Capture button was pressed. (Such information can be gleaned, e.g., by each device transmitting a brief WhoAmI message periodically, receiving such messages from other nearby devices, and logging the data thus received.)

Still other context information might be the location from which the Capture operation was initiated. This can be achieved by decoding of a second watermark signal, e.g., on a low level white-noise broadcast. The public address system in public places, for example, can broadcast a generally-indiscernible noise signal that encodes a watermark signal. Devices 10 can be arranged to detect two (or more) watermarks from the same audio stream, e.g., by reference to two pseudo-random sequences with which the different watermarks are encoded. One identifies the audible audio, the other identifies the location. By such an arrangement, for example, the device 10 can indicate to the server 28 (and thence to the user destination 32) the location at which the user encountered the audio. (This notion of providing location context information by subliminal audio that identifies the location has powerful applications beyond the particular scenario contemplated herein.)

In some embodiments, the device 10 can buffer watermark information from several previous audio events, permitting the user to scroll back and select (e.g., in conjunction with a screen display 16) the ID of the desired audio.

An arrangement like the foregoing may require that the decoded watermark information be interpreted for the user, so that the user is not presented simply a raw binary watermark payload. The interpreted information presented to the user can comprise, e.g., the source (CNN Airport News, WABC Radio, CD-ROM, MTV), the artist (Celine Dion), the title (That's the Way It Is), and/or the time decoded (3:38:02 p.m.), etc.

One way to achieve the foregoing functionality is to convey both the binary UID payload and abbreviated text (e.g., 5- or 6-bit encoded) through the watermark "channel" on the audio. In one such arrangement, the watermark channel conveys data a UID, four characters of text, and associated error-correcting bits, every ten seconds. In the following ten seconds the same UID is conveyed, together with the next four characters of text.

Another way to achieve such functionality is to provide a memory in the device 10 that associates the watermark payload (whether UID or field-based) with corresponding textual data (e.g., the source/artist/title referenced above). A 1 megabyte semiconductor non-volatile RAM memory, for example, can serve as a look-up table, matching code numbers to artist names and song titles. When the user queries the device to learn the identify of a song (e.g., by operating a button 18), the memory is indexed in accordance with one or more fields from the decoded watermark, and the resulting textual data from the memory (e.g. source/artist/title) is presented to the user.

Such a memory will commonly require periodic updating. The wireless interface 20 in device 10 can include reception capabilities, providing a ready mechanism for providing such updated data. In one embodiment, the device "awakens" briefly at otherwise idle moments and tunes to a predetermined frequency at which updated data for the memory is broadcast, either in a baseband broadcast channel, or in an ancillary (e.g. SCA) channel.

In variants of the foregoing, internet delivery of update data for the memory can be substituted for wireless delivery. For example, a source/artist/title memory in the device 10 can be updated by placing the device in a "nest" every evening. The nest (which may be integrated with a battery charger for the appliance) can have an internet connection, and can exchange data with the device by infrared, inductive, or other proximity-coupling technologies, or through metal contacts. Each evening, the nest can receive an updated collection of source/artist/title data, and can re-write the memory in the device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener may send a copy of the song to the friend. This instruction can be issued by pressing a "Send" button, or by invoking a similar function on a graphical (or voice- or gesture-responsive) user interface. In response, the device so-instructed can query the person as to the recipient. The person can designate the desired recipient(s) by scrolling through a pre-stored list of recipients to select the desired one. (The list can be entered through a computer to which the device is coupled.) Alternatively, the user can type-in a name (if the device provides a keypad), or a portion thereof sufficient to uniquely identify the recipient. Or the person may speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should stored or queued, the format in which the music should be delivered, etc.) stored therein. In response to such command, the appliance dispatches instructions to the server 28, including an authorization to incur any necessary charges (e.g., by debiting the sender's credit card). Again, the server 28 attends to delivery of the music in a desired manner to the specified recipient.

Still further, a listener may query the device (by voice, GUI or physical button, textual, gesture, or other input) to identify CDs on which the ambient audio is recorded. Or the listener may query the device for the then-playing artist's concert schedule. Again, the appliance can contact a remote database and relay the query, together with the user ID and audio ID data. The database locates the requested data, and presents same to the user—either through a UI on device 10, or to the destination 32. If desired, the user can continue the dialog with a further instruction, e.g., to buy one of the CDs on which the then-playing song is included. Again, this instruction may be entered by voice, GUI, etc., and dispatched from the device to the server, which can then complete the transaction in accordance with pre-stored information (e.g. credit card account number, mailing address, etc.). A confirming message can be relayed to the device 10 or destination 32 for presentation to the user.

While the technology particularly contemplates audio, the principles detailed above find applications in many other media, and in many other applications of the MediaBridge server 28.

Moreover, while the technology particularly contemplates watermarks as the channel by which audio is identified, in other embodiments different techniques can be used. For example, digital radio protocols provide ID fields by which audio can be identified. Similarly, IP protocols for internet delivery of radio include identification fields within their packet formats. Accordingly, audio distributed according to formats that include audio IDs therein can likewise be employed according to the present technology.

In view of the many embodiments to which the principles of my technology may be applied, it should be apparent that the detailed embodiment is illustrative only and should not be taken as limiting the scope of the technology. Rather, I claim as my technology all such modifications as may fall within the scope and spirit of the following claims, and equivalents thereto.

What is claimed is:

1. A method comprising:
converting, using a microphone in a device, ambient sound into electrical signals;
converting the electrical signals into data;
processing the data to determine location information associated with a location of the device, wherein the location information is encoded in the data, wherein processing the data to determine location information comprises decoding a digital watermark signal in the ambient sound; and
taking an action involving the determined location information, wherein the location information is determined by reference to the ambient sound.

2. The method of claim 1, wherein the processing comprises cyclically applying plural different decoding techniques until one produces valid data, by reference to a checksum.

3. The method of claim 2, wherein the processing comprises decoding a Digital Object Identifier song ID from a digital watermark signal conveyed by the data.

4. The method of claim 3, further comprising sending a request to a remote server to deliver a file corresponding to the Digital Object Identifier song ID to a remote destination.

5. The method of claim 1, wherein the action comprises sending the location information to a remote device.

6. The method of claim 1, wherein the ambient sound is emitted by a public address system.

7. The method of claim 1, wherein the ambient sound comprises.

8. The method of claim 1, wherein the location information is encoded in a pseudo-random signal in the ambient sound.

9. An apparatus comprising:
a microphone configured to convert ambient sound into electrical signals; and
a processor configured to:
convert the electrical signals into data;
process the data by decoding a digital watermark signal in the ambient sound to determine location information associated with a location of the apparatus, wherein the location information is encoded in the data; and
take an action involving the determined location information, wherein the location information is determined by reference to the ambient sound.

10. The apparatus of claim 9, wherein the processor is further configured to cyclically apply plural different decoding techniques until one produces valid data, by reference to a checksum.

11. The apparatus of claim 10, wherein the processor is further configured to decode a Digital Object Identifier song ID from a digital watermark signal conveyed by the data.

12. The apparatus of claim 11, wherein the processor is further configured to send a request to a remote server to deliver a file corresponding to the Digital Object Identifier song ID to a remote destination.

13. The apparatus of claim 9, wherein the action comprises sending the location information to a remote device.

14. The apparatus of claim 9, wherein the ambient sound comprises subliminal sound.

15. The apparatus of claim 9, wherein the location information is encoded in a pseudo-random signal in the ambient sound.

16. A non-transitory computer-readable medium having instructions stored thereon, the instructions comprising:
instructions to convert ambient sound into electrical signals;
instructions to convert the electrical signals into data;
instructions to process the data to decode a digital watermark signal in the ambient sound to determine location information associated with a location of a device, wherein the location information is encoded in the data; and
instructions to take an action involving the determined location information, wherein the location information is determined by reference to the ambient sound.

17. The non-transitory computer-readable medium of claim 16, further comprising instructions to cyclically apply plural different decoding techniques until one produces valid data, by reference to a checksum.

* * * * *

UNITED STATES PATENT AND TRADEMARK OFFICE
CERTIFICATE OF CORRECTION

PATENT NO. : 8,122,257 B2  Page 1 of 1
APPLICATION NO. : 12/820744
DATED : February 21, 2012
INVENTOR(S) : Rhoads et al.

It is certified that error appears in the above-identified patent and that said Letters Patent is hereby corrected as shown below:

Column 8, lines 14-15, in Claim 7, delete "The method of claim 1, wherein the ambient sound comprises." and insert -- The method of claim 1, wherein the ambient sound comprises subliminal sound. --.

Signed and Sealed this
Fourth Day of September, 2012

David J. Kappos
*Director of the United States Patent and Trademark Office*